Jan. 30, 1968   A. CHRISTENSEN   3,366,461
APPARATUS FOR EXOTHERMIC CATALYTIC REACTIONS
Filed May 11, 1964   5 Sheets-Sheet 1

AXEL CHRISTENSEN
INVENTOR.
BY *J-T-Chaboty*
AGENT

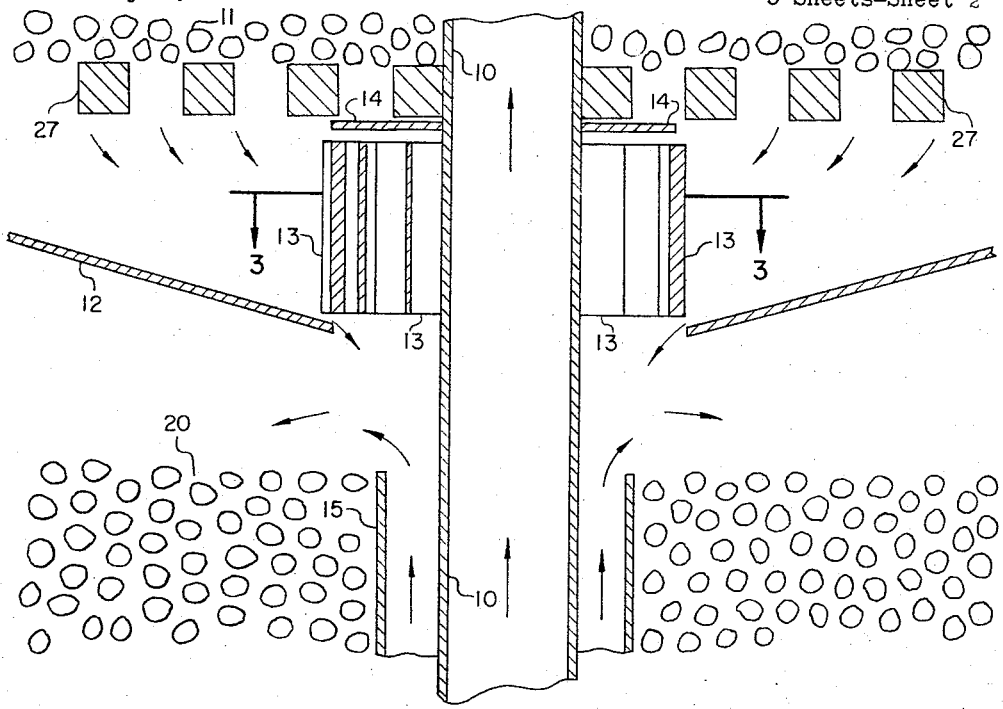
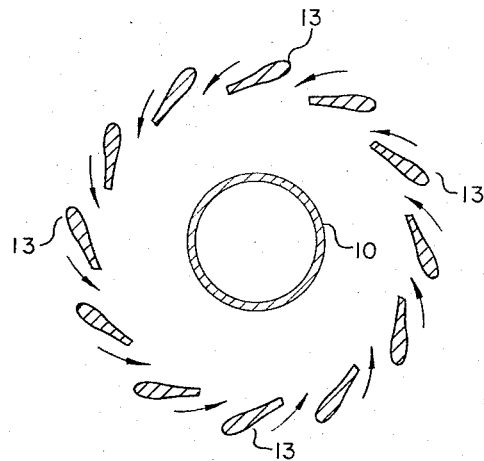
FIG. 2
FIG. 3
AXEL CHRISTENSEN
INVENTOR.

AXEL CHRISTENSEN
INVENTOR.

AXEL CHRISTENSEN
INVENTOR.

BY J. T. Chaboty
AGENT

United States Patent Office 3,366,461
Patented Jan. 30, 1968

3,366,461
APPARATUS FOR EXOTHERMIC
CATALYTIC REACTIONS
Axel Christensen, Stamford, Conn., assignor to Chemical Construction Corporation, New York, N.Y., a corporation of Delaware
Filed May 11, 1964, Ser. No. 366,347
15 Claims. (Cl. 23—289)

ABSTRACT OF THE DISCLOSURE

An apparatus is provided for carrying out exothermic catalytic reactions in a plurality of catalyst beds disposed in vertical series within a vertically oriented reactor shell. A heat exchanger section is provided in the lower end of the reactor shell and below the beds, to preheat the main feed gas stream by heat exchange with reacted gas. The preheated feed gas passes centrally upwards from the heat exchange section through a central conduit and then flows downwards through the uppermost catalyst bed. A gas diversion baffle is provided below this bed, and extends inwards and downwards to a terminus adjacent to the conduit. A plurality of vertically oriented and spaced apart whirl vanes are provided adjacent to the inner terminus of the baffle, to impart a whirling motion to the inwardly and downwardly flowing partially reacted gas. A cold feed gas stream is passed upwards for quench purposes, through a lower vertical duct which extends centrally upwards from below the reactor shell, and the quench gas stream next passes through gas distributing means such as a central block having annular vertical passages, which serve to pass the quench gas upwards and through an annular passage between the central conduit and an outer coaxial conduit. The outer conduit terminates below the lower end of the baffle, and the quench gas is discharged from the annular passage into the downflowing and whirling stream of hot partially reacted gas, to provide a quench effect and immediate mixing of the gas streams. Similar gas mixing apparatus is provided below the succeeding beds, except for the lowest bed which discharges fully reacted gas to the heat exchanger section. Cooled reacted gas is removed from the reactor shell below the heat exchanger section.

Figure 1:
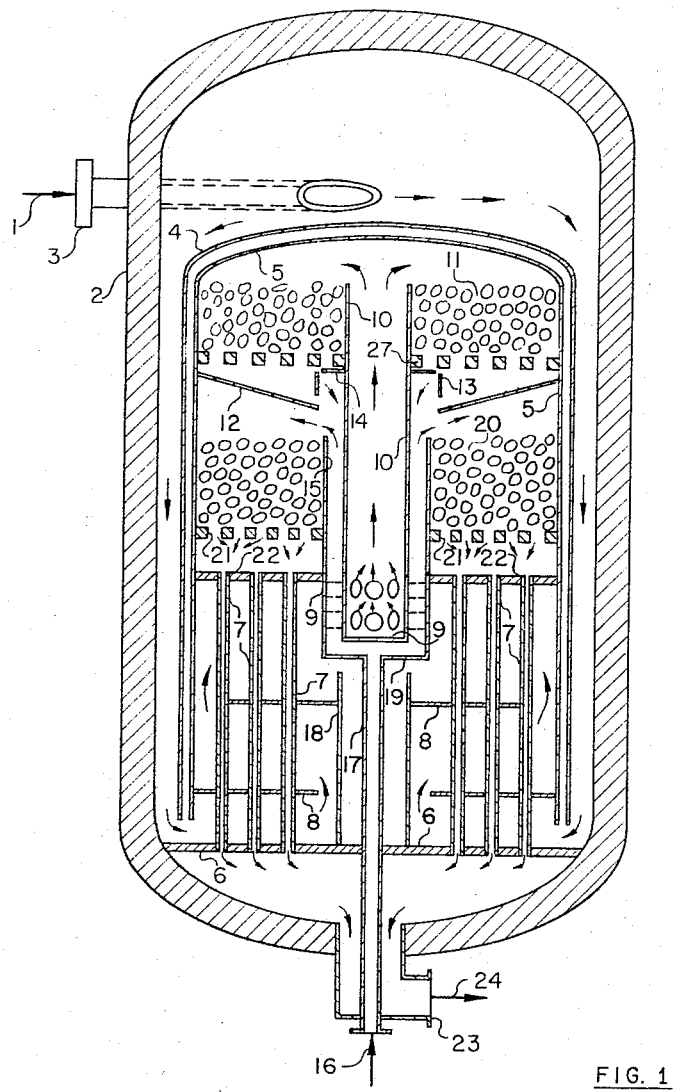

This invention relates to an apparatus for exothermic catalytic reactions, in which a gaseous reaction mixture is passed through two or more stationary catalyst beds in series, with interbed injection of cold reaction gas for temperature control. An improved unitary apparatus combination is provided, which accomplishes such reactions in an improved and more economical manner. The invention is particularly applicable to reactions which are carried out at elevated pressure, such as the synthesis of ammonia from its elements, synthesis of methanol from hydrogen and carbon monoxide, the Fischer-Tropsch synthesis of hydro-carbons and high alkanols and similar hydrogenation reactions.

A simplified apparatus for carrying out exothermic catalytic reactions is disclosed in U.S. Patent No. 1,833,188. In this patent, the flow of reaction gas is annularly downwards within the reactor shell, upwards through a coil in a heat exchanger section, centrally upwards through a central conduit, and downwards through the catalyst bed. The reacted gas passes through the heat exchanger section external to the coil, and is finally removed from the bottom of the reactor shell for external utilization. No provision is made for temperature control within the catalyst bed, and thus the extent of reaction is limited by the allowable temperature rise during reaction in the single catalyst bed.

An improved apparatus of the same nature with interbed temperature control is disclosed in U.S. Patent No. 1,921,776. In this case the feed gas is passed through a lower heat exchanger section, and then passes centrally upwards to an upper catalyst bed section. The heated and partially reacted gas flowing downwards from the upper catalyst bed is cooled by a lateral injection of cold unreacted gas. This arrangement is complex, and fails to provide complete and uniform mixing of the gas streams.

In the present invention, an improved and simplified apparatus arrangement is provided, which accomplishes interbed temperature control by gas mixing in an improved manner. The main stream of feed gas is conducted downwards in the reactor shell in the annular space between the shell and an inner circulation plate. The gas stream then flows upwards through a lower heat exchanger section, and finally through a central conduit which extends upwards from the heat exchanger section to the top of the upper catalyst bed section. The gas flows downwards through the upper catalyst bed, and is diverted inwards by a lower gas baffle. An annular opening is provided between the gas baffle and the central conduit, and the downflowing partially reacted gas is mixed with cold by-pass gas.

The by-pass gas is conducted into the reactor shell in a unique manner. A lower inlet duct is provided for by-pass gas, extending centrally upwards through the heat exchanger section. A conduit is provided external to the central conduit, and extends upwards from the heat exchanger section terminating at the annular opening between the gas baffle and the central conduit. The by-pass gas is centrally passed from the inlet duct to the annular passage external to the central conduit, and thus passes upwards centrally to quench-cool the partially reacted gas from the upper catalyst bed. The resultant mixed gas stream then is dispersed into the lower catalyst bed, flowing downwards for final reaction. The fully reacted gas passes downwards through the heat exchanger section for cooling, and is finally removed from the reactor shell for external utilization.

In cases where three or more catalyst beds are provided in the reactor, interbed cooling between succeeding beds is attained by providing a plurality of coaxial concentric lower inlet ducts, which extend centrally upwards through the heat exchanger section. A first stream of cold by-pass gas is passed through the innermost duct, for interbed cooling of the gas stream between the first and second catalyst beds as described supra. Succeeding streams of cold by-pass gas are passed through the annular passages between the concentric ducts, for interbed cooling after the second and succeeding catalyst beds. A plurality of annular conduits is provided external to the central conduit which extends centrally upwards from the heat exchanger section to the top of the first catalyst bed and conducts the main stream of warmed unreacted gas to the catalyst bed section. Each succeeding annular conduit, of larger diameter than the previous one, terminates at the next lower catalyst bed to provide interbed cooling between successive catalyst beds. The annular streams of cold by-pass gas are centrally conducted from the annular passages between lower inlet ducts to respective annular passages between the annular conduits.

The transfer of cold by-pass gas to annular passages between the annular conduits is preferably carried out by provision of a central cylindrical block between the heat exchanger and catalyst bed sections. The central block is provided with a plurality of radial horizontal passages, for transfer of warmed unreacted gas from the heat exchanger section to a central chamber from which the central conduit described supra extends upwards. The central block is also provided with a plurality of vertical passages, for centralized transfer of cold by-pass gas from the lower inlet duct or ducts to the annular passages between the annular conduits.

The unitary apparatus combination of the present invention has a principal advantage in that no expansion joints are required to accommodate for thermal expansion in service. As will appear infra, the accommodation between the several apparatus elements serves to accomplish the flow of process gas in a centralized manner, thus eliminating differential expansion and expansion joints. In addition, complete and uniform quench cooling of the partially reacted gas stream by the cold by-pass gas is accomplished, with uniform mixing and an avoidance of channeling or unequal temperature levels in the partially reacted gas. Finally, the apparatus of the present invention is relatively simple and may be readily fabricated and assembled. Thus the capital cost of the assembled reactor unit is substantially lowered.

It is an object of the present invention to provide an improved apparatus for exothermic catalytic reactions.

Another object is to provide an apparatus for exothermic catalytic reactions which is free of expansion joints.

A further object is to provide an apparatus for exothermic catalytic reactions having two or more catalyst beds with improved quench of the partially reacted gas with cold by-pass gas.

An additional object is to provide an apparatus for exothermic catalytic reactions having unitary centralized flow of both warmed unreacted gas and cold by-pass gas.

Figure 4:
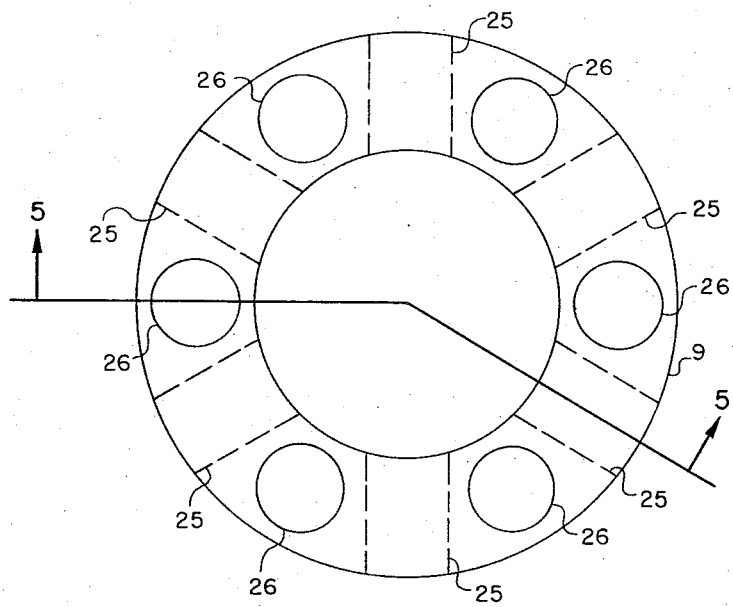
Figure 5:
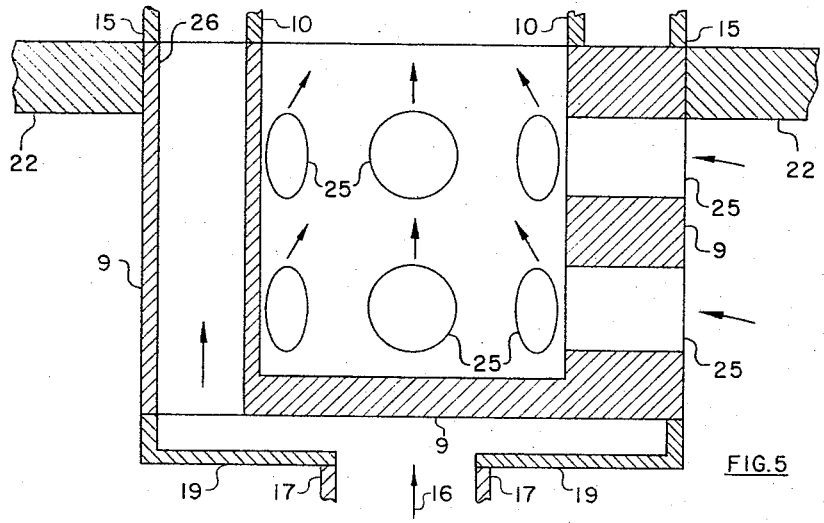
Figure 6:
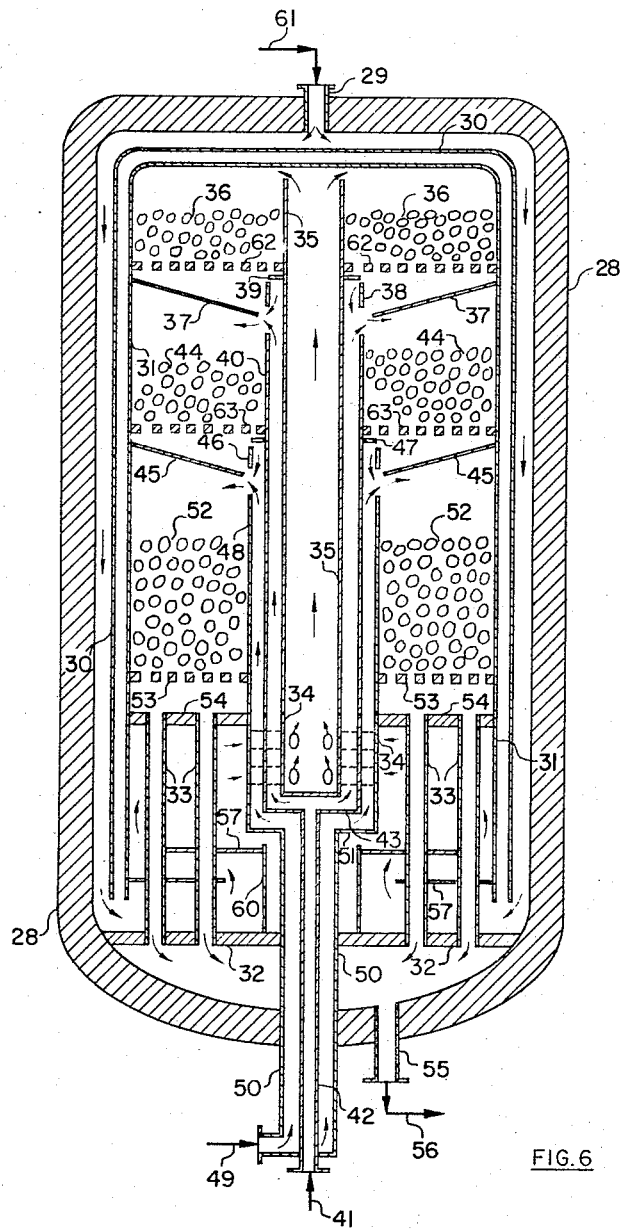
Figure 7:
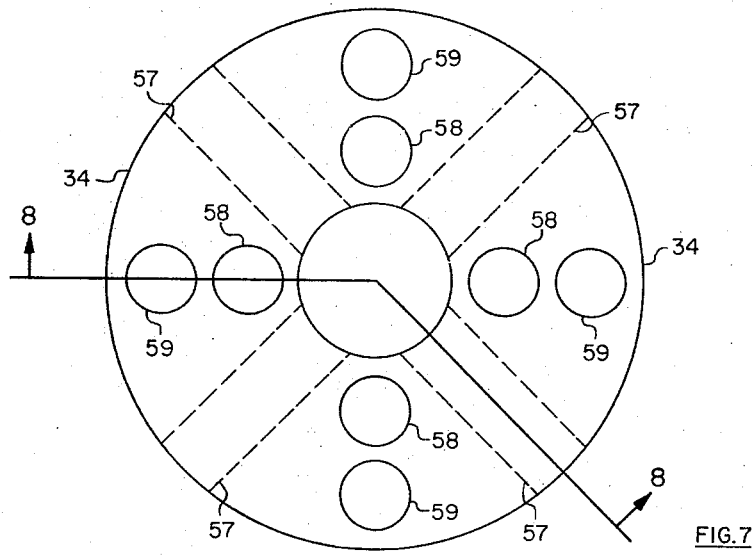
Figure 8:
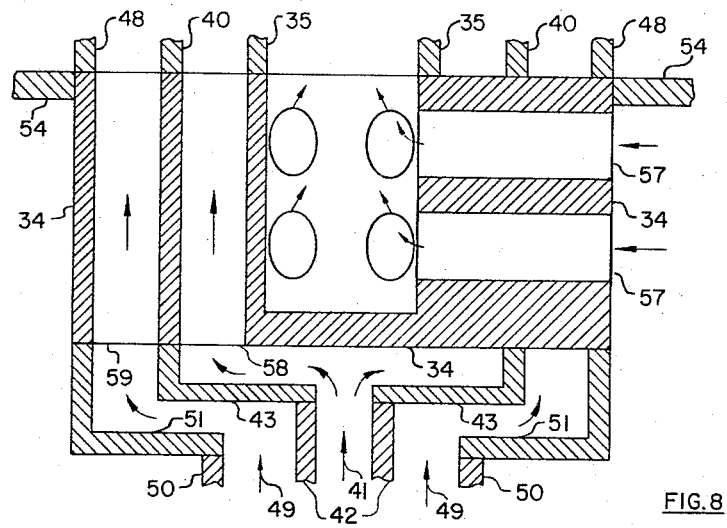

These and other objects and advantages of the present invention will become evident from the description which follows. Referring to the figures, FIGURE 1 is an overall elevation view of the apparatus of the present invention, showing a simplified case of two catalyst beds in series, FIGURE 2 is an enlarged elevation view of the gas baffle and whirl vanes assemblage of the apparatus, FIGURE 3 is a sectional view of FIGURE 2, taken on section 3—3, FIGURE 4 is an enlarged plan view of the central block for centralized transfer of both warmed unreacted gas and cold by-pass quench gas, FIGURE 5 is a sectional elevation view of FIGURE 4, taken on section 5—5, FIGURE 6 is an elevation view of an alternative apparatus arrangement of the present invention, showing the co-acting combination of apparatus elements to be provided when the number of catalyst beds is three or more in series, and interbed cooling is attained between more than two catalyst beds, FIGURE 7 is an enlarged plan view of the modified central block of FIGURE 6, for centralized flow of both warmed unreacted gas and first and second streams of cold by-pass quench gas, and FIGURE 8 is a sectional elevation view of FIGURE 7, taken on section 8—8.

Referring now to FIGURE 1, the main feed gas stream 1 is passed into reactor shell 2 by means of feed nozzle 3, which is preferably disposed with an outlet opening tangential to the inner wall of shell 2. The tangential orientation of nozzle 3 imparts a whirling, cyclonic motion to the gas stream within the shell and thus provides a more uniform flow pattern for the gas stream within the reactor shell. The feed gas stream now flows downward in the annular space between optional outer vertical circulation plate 4 and the wall of shell 2. The gas stream thus serves to cool the shell 2 by insulating the shell from the catalyst beds and other internals. In addition, a further insulating effect is obtained by providing an inner circulation plate 5 parallel to optional plate 4. The resulting gas space between the parallel plates 4 and 5 acts as an effective thermal barrier.

The downflowing feed gas stream is now diverted by lower tube sheet 6 into the shell side of the lower heat exchanger section and external to vertical tubes 7 which contain downflowing hot reacted gas. The feed gas is provided with a horizontal flow component transverse to tubes 7 by means of horizontal baffles 8, and thus the rising feed gas is warmed in the heat exchanger section by heat exchange with the hot reacted gas within tubes 7. The warmed feed gas next passes from the upper part of the heat exchanger section and through a group of horizontal passages in central block 9. The feed gas thus collects in a central chamber in block 9, and passes upwards through central conduit 10 to the top of upper catalyst bed 11.

The warmed feed gas now passes downwards through upper catalyst bed 11, and partial catalytic reaction or conversion takes place, with concomitant temperature rise. The warmed and partially reacted gas stream passes through catalyst support grid 27 and is diverted inwards below the bottom of bed 11 by gas baffle 12, which may be flat but is preferably in the form of an inverted truncated cone to obtain more uniform flow of gas. The partially reacted gas stream thus is directed centrally, and passes gas baffles 13, which as will appear infra are preferably in the form of whirl vanes. Auxiliary horizontal baffles 14 may also be provided to divert and direct the gas stream through baffles 13.

The warmed and partially reacted gas stream leaving the upper catalyst bed 11 is now quench-cooled by mixture with upflowing cold by-pass feed gas, which is added through the annular space between central conduit 10 and concentric outer conduit 15. The cold by-pass feed gas stream is admitted as stream 16 into the lower portion of the reactor shell, passing upwards through lower central inlet duct 17. A retention baffle 18 is provided external to duct 17, and serves to direct gas flow on the shell side of the heat exchanger section in conjunction with baffle 8. The rising cold by-pass gas stream is discharged from duct 17 into a gas manifold defined by lower horizontal baffle 19 below central block 9. The by-pass gas stream next passes upwards through a plurality of vertical passages in block 9, and thence into the annular space between central conduit 10 and outer concentric conduit 15, for final mixing with the warm partially reacted gas from upper bed 11.

The quench-cooled and partially reacted gas stream now passes downwards through lower catalyst bed 20, and final reaction or catalytic conversion of the gas stream takes place. The hot and fully converted gas stream then passes through catalyst support grid 21, and is diverted by upper tube sheet 22 into heat exchanger tubes 7. The converted gas stream is cooled in tubes 7, and is discharged from the lower ends of tubes 7, passing via outlet nozzle 23 to external utilization as stream 24.

In FIGURE 2, an enlarged elevation view of the gas baffle and whirl vanes assemblages of the present invention is shown in detail. The baffle 13 preferably consists of a plurality of streamlined air-foil shaped vertical whirl vanes, which serve to impart a whirling circular motion to the downflowing warm gas. This flow sequence serves to provide uniform mixing of the warm partially reacted gas with the upflowing cold by-pass gas which is flowing upwards in the annular space between central conduit 10 and outer concentric conduit 15.

FIGURE 3 is a plan view of FIGURE 2, taken on section 3—3, and illustrates the flow of the warm partially reacted gas stream through the streamlined, air-foil shaped whirl vanes of baffle 13. This preferred configuration imparts a whirling circular flow to the gas stream, as well as a downwards flow component, and thus the downflowing gas stream is uniformly mixed with the rising quench stream of cold by-pass gas.

FIGURE 4 is an enlarged plan view of the central block 9, which provides for centralized flow of warmed unreacted gas from the shell of the heat exchanger section to the central chamber below the circular central conduit 10 via radial horizontal passages 25. In addition, block 9 simultaneously provides for flow of cold by-pass gas stream 16, centralized with respect to the overall reactor internals, from the central inlet duct 17 to the annular passage between central conduit 10 and outer concentric conduit 15 via separate vertical passages 26 which extend through sectors of the block between adjacent passages 25. Central block 9 thus provides for simultaneous centralized flow of two separate gas streams, namely the warmed unreacted gas and the cold by-pass gas.

FIGURE 5 is a sectional elevation view of FIGURE 4, taken on section 5—5, and further shows the relation between the horizontal passages 25 and discrete vertical passages 26 within central block 9. In addition, sections of contiguous and adjacent apparatus elements co-acting with central block 9 are also shown in FIGURE 5.

Various alternatives within the scope of the present invention will occur to those skilled in the art. Thus, it will be apparent that the central block 9 may alternatively be replaced by a substitute arrangement involving a group of gas baffles and pipes. Thus, the horizontal passages 25 in block 9 could be replaced by a series of horizontal pipes extending from an outer cylindrical baffle to an inner cylindrical baffle. The inner baffle would serve to define a central chamber below central conduit 10. The annular space between the baffles and external to the pipes would serve to conduct the cold by-pass gas from the lower inlet duct 17 to the annular space between conduits 10 and 15.

Alternative arrangements may also be provided for the whirl vanes of baffles 13. Thus, baffle 13 may be flat or curved, however in this case smooth streamline flow of warmed gas from bed 11 into a whirling circular flow prior to mixing of the gas with cold by-pass gas is not as readily attained. In another alternative and simplification of the apparatus, baffles 13 and 14 may be totally omitted. This alternative is relatively less desirable, since uniform mixing of the gas streams may not be attained.

As mentioned supra, gas circulation plates 4 and 5 may alternatively consist merely of a single plate, however in this case the desirable insulating effect is not attained.

An alternative modification of the basic apparatus concept of the invention is presented in FIGURE 6. In this case, an arrangement is illustrated whereby cold by-pass gas may be admitted in a plurality of streams to seperately quench the hot partially converted gas stream after a plurality of partial reaction catalyst beds. The basic modification of FIGURE 6 compared to FIGURE 1 is that three catalyst beds in series are illustrated, with interbed cooling of the main gas stream by addition of separate streams of cold by-pass gas after the first and second beds.

In FIGURE 6, the main feed gas stream 61 is passed into reactor shell 28 by means of feed nozzle 29. The feed gas stream now flows downward in the annular space between optional outer vertical circulation plate 30 and the wall of shell 28. The gas stream thus serves to cool the shell 28 by insulating the shell from the catalyst beds and other internals. In addition, a further insulating effect is obtained by providing inner circulation plate 31 parallel to optional plate 30. The resulting gas space between the parallel plates 30 and 31 acts as an effective thermal barrier.

The downflowing feed gas stream is now diverted by lower tube sheet 32 into the shell of the lower heat exchanger section and external to vertical tubes 33 which contain downflowing hot reacted gas. The feed gas is directed and provided with a horizontal flow component transverse to tubes 33 by means of horizontal baffles 57 and vertical baffle 60, and thus the rising feed gas is warmed in the heat exchanger section by heat exchange with the hot reacted gas within tubes 33. The warmed feed gas next passes centrally inwards from the upper part of the heat exchanger section and through a group of horizontal passages in central block 34. Block 34 is similar to block 9 described supra, except that two sets of independent vertical passages for transfer of cold by-pass gas streams are provided in the block, as will appear infra. The warmed feed gas, passing through the horizontal passages in central block 34, collects in a central chamber in block 34, and passes upwards through central conduit 35 to the top of upper catalyst bed 36.

The warmed feed gas now passes downwards through upper catalyst bed 36, and partial catalytic reaction or conversion takes place, with cocomitant temperature rise. The warmed and partially reacted gas stream is diverted inwards at the bottom of bed 36 below catalyst support grid 62 by gas baffle 37, which is preferably of an inverted truncated conical configuration similar to baffle 12 described supra. The partially reacted gas stream thus is directed centrally, and passes vertical gas baffles 38, which are preferably in the form of streamlined air-foil shaped vertical whirl vanes, similar to baffles 13 described supra. Auxiliary horizontal baffles 39 are also provided to direct and divert the gas stream through baffles 38.

The warmed and partially reacted gas stream leaving upper catalyst bed 36 is now quench-cooled by mixture with a first stream of up-flowing cold by-pass feed gas, which is added through the annular space between central conduit 35 and the first concentric outer conduit 40. This first stream of cold by-pass gas is admitted at the lower end of the reactor shell as stream 41, passing upwards through lower central inlet duct 42. The rising first stream of cold by-pass gas is discharged from duct 42 into a gas manifold below central block 34 defined by lower horizontal baffle 43. The by-pass gas stream next passes upwards through a plurality of inner vertical passages in block 34, and thence into the annular space between central conduit 35 and the first outer concentric conduit 40, for mixing with the warm partially reacted gas from upper bed 36.

The quench-cooled and partially reacted gas stream now passes downwards through middle catalyst bed 44, and further reaction or catalytic conversion of the gas stream takes place, with concomitant temperature rise. The warmed and further reacted gas stream is diverted inwards at the bottom of bed 44 below catalyst support grid 63 by gas baffle 45, which is preferably of a configuration similar to baffle 12 described supra. The further reacted gas stream thus is directed centrally, and passes vertical gas baffles 46, which are preferably of a streamlined, air-foil shaped whirl vanes configuration similar to baffles 13 described supra. Auxiliary baffles 47 are also provided to direct and divert the gas stream through baffles 46.

The warmed and further reacted gas stream leaving middle catalyst bed 44 is now quench-cooled by mixture with a second stream of up-flowing cold by-pass feed gas, which is added through the annular space between the first concentric outer conduit 40 and the second concentric outer conduit 48. This second stream of cold by-pass gas is admitted at the lower end of the reactor shell as stream 49, passing upwards through the annular space between lower central inlet duct 42 and concentric outer inlet duct 50. The rising second stream of cold by-pass gas is discharged from the annular space between ducts 42 and 50 into a gas manifold below central block 34 defined between baffles 43 and 51. The second stream of cold by-pass gas next passes upwards through a plurality of outer vertical passages in block 34, and thence into the annular space between conduits 40 and 48, for mixing with the warm further reacted gas from middle bed 44.

The quench-cooled and further reacted gas stream now passes downwards through lower catalyst bed 52, and final reaction or catalytic conversion of the gas stream takes place. The hot and fully converted gas stream then passes through catalyst support grid 53, and is diverted by upper tube sheet 54 into heat exchanger tubes 33. The converted gas stream is cooled in tubes 33, and is discharged from the lower ends of tubes 33, passing via outlet nozzle 55 to external utilization as stream 56.

It will be apparent that the apparatus concept of FIGURE 6, in which a plurality of concentric lower inlet ducts is combined with a plurality of sets of vertical passages in central block 34 and a plurality of concentric upper conduits, may be extended to provide separate flow of cold by-pass quench gas to any number of catalyst beds in series. Thus the apparatus concept of the present invention may be broadly extended to multi-bed catalytic conversion, regardless of the number of separate catalyst beds.

FIGURE 7 is an enlarged plan view of the central block 34 of FIGURE 6, which provides for centralized flow of warmed unreacted gas from the shell of the heat exchanger section to the central chamber below the circular central conduit 35 via radial horizontal passages 57. In addition, block 34 simultaneously provides for flow of a first stream 41 of cold by-pass gas, centralized with respect to the overall reactor internals, from the central lower inlet duct 42 to the annular passage between central conduit 35 and concentric outer conduit 40 via the separate inner group of vertical passages 58 which extend through sectors of the block 34 between adjacent passages 57. Finally, block 34 also provides for flow of the second stream 49 of cold by-pass gas from the annular passage between central lower inlet duct 42 and concentric outer duct 50 to the annular passage between concentric outer conduit 40 and concentric outer conduit 48 via the separate outer group of vertical passages 59 which extend through sectors of the block 34 between adjacent passages 57 and parallel to inner vertical passages 58. Central block 34 thus provides for simultaneous centralized flow of three separate gas streams, namely the warmed unreacted gas, first cold by-pass stream 41, and second cold by-pass stream 49.

FIGURE 8 is a sectional elevation view of FIGURE 7, taken on section 8—8, and further shows the relation between the horizontal passages 57 and discrete vertical passages 58 and 59 within central block 34. In addition, contiguous and adjacent apparatus elements co-acting with block 34 are also shown in FIGURE 8.

Other alternative apparatus arrangements within the scope of the present invention, besides those described supra, will occur to those skilled in the art. In addition, it will be understood that various auxiliary apparatus elements and converter appurtenances, such as start-up gas heater, control thermocouples and stuffing boxes will also be provided in practice. These apparatus elements and details have been omitted from the description supra in the interest of clarity, as the provision of such elements is well-known to those skilled in the art. Thus for example, referring to FIGURE 6, a start-up electric resistor type of gas heater could be provided extending downwards through feed nozzle 29 and passing directly through gas baffles 30 and 31 into central conduit 35 to heat the upflowing stream of feed gas to upper catalyst bed 36.

I claim:

1. An apparatus for exothermic catalytic reactions comprising an upright container shell, a lower heat exchanger section within said shell, means for introducing unreacted gas into said shell whereby said unreacted gas passes upwardly through said heat exchanger section, said unreacted gas being thereby warmed in heat exchange relation with reacted gas, means for passing warmed unreacted gas centrally from the upper portion of said heat exchanger section and into a central conduit, said central conduit extending upwards from said heat exchanger section to the top of an upper catalyst bed section, a gas baffle below said upper catalyst bed section, said gas baffle extending inwards and downwards from below the outer edge of said upper catalyst bed section and terminating adjacent to said central conduit, whereby partially reacted gas flows inwards from said upper catalyst bed section to an annular discharge opening between said gas baffle and said central conduit, a plurality of spaced apart vertical whirl vanes, said vanes extending upwards from adjacent to the inner end of said baffle and terminating below said upper catalyst bed section, whereby the partially reacted gas discharged from said upper catalyst bed into said annular discharge opening is provided with a whirling circular motion, a lower inlet duct for cold by-pass unreacted gas, said inlet duct extending upwards through said heat exchanger section, an outer coaxial conduit external to said central conduit, said outer coaxial conduit extending upwards and terminating at the annular discharge opening for partially reacted gas defined by said gas baffle, means to centrally pass cold by-pass unreacted gas from said inlet duct to the annular passage between said conduits, whereby said cold by-pass unreacted gas combines with partially reacted gas below said upper catalyst bed section, and the combined gas stream flows downwards into a lower catalyst bed section, said lower catalyst bed section being disposed between said upper catalyst bed section and said heat exchanger section, said combined gas stream passing downwards through said lower catalyst bed section and through said heat exchanger section, and means below said heat exchanger section to remove fully reacted and cooled gas from said shell.

2. An apparatus for exothermic catalytic reactions comprising an upright container shell, a lower heat exchanger section within said shell, means for introducing unreacted gas into said shell whereby said unreacted gas passes upwardly through said heat exchanger section, said unreacted gas being thereby warmed in heat exchange relation with reacted gas, a cylindrical block for gas transfer, said block being centrally disposed at the top of said heat exchanger section, said block having a plurality of horizontal passages extending radially inward from said heat exchanger section to a central chamber, whereby said warmed unreacted gas flows centrally inwards from said heat exchanger section to said central chamber, said block also being provided with a plurality of discrete vertical passages which extend through said block from a lower gas manifold below said block, a central conduit extending upwards from said central chamber in said block to the top of an upper catalyst bed section, a gas baffle below said upper catalyst bed section, said gas baffle extending inwards and terminating adjacent to said central conduit, whereby partially reacted gas flows inwards from said upper catalyst bed section to an annular discharge opening between said gas baffle and said central conduit, a lower inlet duct for cold by-pass unreacted gas, said inlet duct extending centrally upwards through said heat exchanger section to said lower gas manifold below said block, whereby cold by-pass unreacted gas is conducted into said vertical passages in said block, an outer coaxial conduit external to said central conduit, said outer coaxial conduit extending upwards from the outer edge of said block external to said vertical passages and terminating at the annular discharge opening for partially reacted gas defined by said gas baffle, whereby said cold by-pass unreacted gas stream passing upwards from said vertical passages in said block is passed to the annular passage between said conduits, said cold by-pass unreacted gas thereby combining with partially reacted gas below said upper catalyst bed section, and the combined gas stream flows downwards into a lower catalyst bed section, said lower catalyst bed section being disposed between said upper catalyst bed section and said heat exchanger section, said combined gas stream passing downwards through said lower catalyst bed section and through said heat exchanger section, and means below said heat exchanger section to remove fully reacted and cooled gas from said shell.

3. An apparatus for exothermic catalytic reactions comprising a vertically oriented cylindrical shell, a vertical gas circulation plate adjacent said shell, means for introducing unreacted gas into said shell disposed above said plate and in the upper portion of said shell, a lower heat exchanger section, means for passing unreacted gas downwards in the annular space between said plate and said shell and into said heat exchanger section, whereby said unreacted gas is warmed in heat exchange relation with reacted gas, means for passing warmed unreacted gas centrally from the upper portion of said heat exchanger section and into a central conduit, said central conduit extending upwards from said heat exchanger section to the top of an upper catalyst bed section, a gas baffle below said upper catalyst bed section, said gas baffle extending inwards from said circulation plate and downwards from below the outer edge of said upper catalyst bed section and terminating adjacent to said central conduit whereby partially reacted gas flows inwards from said upper catalyst bed section to an annular discharge opening between said gas baffle and said central conduit, a plurality of spaced apart vertical whirl vanes, said vanes extending upwards from adjacent to the inner end of said baffle and terminating below said upper catalyst bed section, whereby the partially reacted gas discharged from said upper catalyst bed into said annular discharge opening is provided with a whirling circular motion, a lower inlet duct for cold by-pass unreacted gas, said inlet duct extending centrally upwards through said heat exchanger section, an outer coaxial conduit external to said central conduit, said outer coaxial conduit extending upwards and terminating at the annular discharge opening for partially reacted gas defined by said gas baffle, means to centrally pass cold by-pass unreacted gas from said inlet duct to the annular passage between said conduits whereby said cold by-pass unreacted gas combines with partially reacted gas below said upper catalyst bed section, and the combined gas stream flows downwards into a lower catalyst bed section, said lower catalyst bed section being disposed between said upper catalyst bed section and said heat exchanger section, said combined gas stream passing downwards through said lower catalyst bed section and through said heat exchanger section, and means below said heat exchanger section to remove fully reacted and cooled gas from said shell.

4. Apparatus of claim 3, in which said means for introducing unreacted gas into said shell comprises a gas inlet nozzle which is substantially tangential to the inner surface of said shell.

5. Apparatus of claim 3, in which said gas baffle is in the form of an inverted truncated cone.

6. Apparatus of claim 3, in which said gas circulation plate is a double plate consisting of inner and outer parallel plate sections, with a gas space between said plate sections.

7. Apparatus of claim 3, in which said catalyst bed sections are supported by foraminous horizontal lower support grids.

8. Apparatus of claim 3, in which said means for passing warmed unreacted gas centrally from said heat exchanger section and into said central conduit, and said means to centrally pass cold by-pass unreacted gas from said inlet duct to the annular passage between said conduits, are combined into a gas distributing unit consisting of a cylindrical central block for gas transfer, said block having a plurality of horizontal passages extending radially inward from said heat exchanger section to a central chamber from which said central conduit extends upward, said block having a plurality of discrete vertical passages for upward flow of cold by-pass unreacted gas, the lower end of said outer coaxial conduit being contiguous with the outer edge of said block external to said vertical passages, and a lower gas manifold below said block, said lower inlet duct terminating at said lower gas manifold.

9. Apparatus of claim 3, in which said vertical whirl vanes are of streamlined air-foil shape.

10. An apparatus for exothermic catalytic reactions comprising a vertically oriented cylindrical shell, a vertical gas circulation plate adjacent said shell, means for introducing unreacted gas into said shell disposed above said plate and in the upper portion of said shell, a lower heat exchanger section, means for passing unreacted gas downwards in the annular space between said plate and said shell and into said heat exchanger section, whereby said unreacted gas is warmed in heat exchange relation with reacted gas, means for passing warmed unreacted gas centrally from the upper portion of said heat exchanger section and into a central conduit, said central conduit extending upwards from said heat exchanger section to the top of an upper catalyst bed section, a first gas baffle below said upper catalyst bed section, said first gas baffle extending inwards from said circulation plate and downwards from below the outer edge of said upper catalyst bed section and terminating adjacent to said central conduit, whereby partially reacted gas flows inwards from said upper catalyst bed section to an annular discharge opening between said first gas baffle and said central conduit, a first plurality of spaced apart vertical whirl vanes, and first plurality of vanes extending upwards from adjacent to the inner end of said first gas baffle and terminating below said upper catalyst bed section, whereby the partially reacted gas discharged from said upper catalyst bed into said annular discharge opening is provided with a whirling circular motion, a central lower inlet duct for a first stream of cold by-pass unreacted gas, said central inlet duct extending centrally upwards through said heat exchanger section, a first outer coaxial conduit external to said central conduit, said first outer coaxial conduit extending upwards and terminating at the annular discharge opening for partially reacted gas defined by said first gas baffle, means to pass a first stream of cold by-pass unreacted gas from said central inlet duct to the annular passage between said central conduit and said first outer coaxial conduit, whereby said first stream of cold by-pass gas combines with partially reacted gas below said upper catalyst bed section to form a first combined gas stream and the first combined gas stream flows downwards into a middle catalyst bed section, said middle catalyst bed section being disposed below said upper catalyst bed section, a second gas baffle below said middle catalyst bed section, said second gas baffle extending inwards from said circulation plate and downwards from below the outer edge of said middle catalyst bed section and terminating adjacent to said first outer coaxial conduit, whereby further reacted gas flows inwards from said middle catalyst bed section to an annular discharge opening between said second gas baffle and said first outer coaxial conduit, a second plurality of spaced apart vertical whirl vanes, said second plurality of vanes extending upwards from adjacent to the inner end of said second gas baffle and terminating below said middle catalyst bed section, whereby the further reacted gas discharged from said middle catalyst bed into said annular discharge opening is provided with a whirling circular motion, an outer coaxial inlet duct external to said central lower inlet duct, the annular space between said ducts defining a passage for a second stream of cold by-pass unreacted gas, a second outer coaxial conduit external to said first outer coaxial conduit, said second outer coaxial conduit extending upwards and terminating at the annular discharge opening for further reacted gas defined by said second gas baffle, means to pass a second stream of cold by-pass unreacted gas from the annular passage between said ducts to the annular passage between said first and second outer coaxial conduits, whereby said second stream of cold by-pass gas combines with further reacted gas below said middle catalyst bed section to form a second combined gas stream, and the second combined gas stream flows downwards into a lower catalyst bed section, said lower catalyst bed section being disposed between said middle catalyst bed section and said heat exchanger section, said second combined gas stream passing downwards through said lower catalyst bed section and through said heat exchanger section, and means below said heat exchanger section to remove fully reacted and cooled gas from said shell.

11. Apparatus of claim 10, in which said first and second gas baffles are in the form of an inverted truncated cone.

12. Apparatus of claim 10, in which said gas circulation plate is a double plate consisting of inner and outer parallel plate sections, with a gas space between said plate sections.

13. Apparatus of claim 10, in which said means for passing warmed unreacted gas centrally from said heat exchanger section and into said central conduit, said means to pass a first stream of cold by-pass unreacted gas from said central inlet duct to the annular passage between said central conduit and said first outer coaxial conduit, and said means to pass a second stream of cold by-pass unreacted gas from the annular passage between said ducts to the annular passage between said first and second outer coaxial conduits, are combined into a gas distributing unit consisting of a cylindrical central block for gas transfer, said block having a plurality of horizontal passages extending radially inward from said heat exchanger section to a central chamber from which said central conduit extends upward, said block having a first plurality of discrete inner vertical passages for upward flow of the first stream of cold by-pass unreacted gas, said block having a second plurality of discrete outer vertical passages for upward flow of the second stream of cold by-pass unreacted gas, the lower end of said first outer coaxial conduit being contiguous with the upper surface of said block between the upper outlets of said first and second plurality of passages, the lower end of said second outer coaxial conduit being contiguous with the outer edge of said block, a central lower gas manifold below said block and extending to the lower inlets of said first plurality of inner vertical passages, said central lower inlet duct terminating at said central lower gas manifold, and an annular lower gas manifold below said block and extending to the lower inlets of said second plurality of outer vertical passages, the annular passage between said central lower inlet duct and said outer coaxial inlet duct terminating at said annular lower gas manifold.

14. Apparatus of claim 10, in which said vertical whirl vanes are of streamlined air-foil shape.

15. Apparatus of claim 10, in which said catalyst bed sections are supported by foraminous horizontal lower support grids.

References Cited

UNITED STATES PATENTS

| 1,689,684 | 10/1928 | Reed | 23—289 |
| 2,512,586 | 6/1950 | Stengel | 23—288 |
| 3,041,151 | 6/1962 | Christensen | 23—289 |
| 3,144,312 | 8/1964 | Mertens | 23—289 X |
| 3,254,967 | 6/1966 | Wentworth | 23—289 X |

FOREIGN PATENTS

| 1,274,228 | 9/1961 | France. |
| 496,386 | 8/1954 | Italy. |

JOSEPH SCOVRONEK, *Primary Examiner.*